(12) United States Patent
Dwan

(10) Patent No.: US 9,892,172 B2
(45) Date of Patent: Feb. 13, 2018

(54) DATE AND TIME HANDLING

(71) Applicant: Dropbox, Inc., San Francisco, CA (US)

(72) Inventor: Michael Dwan, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 689 days.

(21) Appl. No.: 13/888,118

(22) Filed: May 6, 2013

(65) Prior Publication Data
US 2014/0280200 A1 Sep. 18, 2014

Related U.S. Application Data

(60) Provisional application No. 61/801,318, filed on Mar. 15, 2013.

(51) Int. Cl.
G06F 17/00 (2006.01)
G06F 17/30 (2006.01)

(52) U.S. Cl.
CPC .............................. G06F 17/30551 (2013.01)

(58) Field of Classification Search
CPC .................................................... G04G 9/0076
USPC ............................................. 707/746; 368/21
See application file for complete search history.

(56) References Cited

U.S. PATENT DOCUMENTS

| | | | |
|---|---|---|---|
| 6,055,246 A * | 4/2000 | Jones | G11B 27/031 370/394 |
| 6,704,816 B1 * | 3/2004 | Burke | G06F 15/7867 708/231 |
| 6,950,989 B2 | 9/2005 | Rosenzweig et al. | |
| 7,472,198 B2 | 12/2008 | Gupta et al. | |
| 7,516,407 B2 | 4/2009 | Dabrowski | |
| 8,358,358 B2 | 1/2013 | Gallagher et al. | |
| 8,903,814 B2 * | 12/2014 | Cai | G06F 17/30336 707/725 |
| 2007/0121425 A1 * | 5/2007 | Eble | G04G 9/0076 368/21 |
| 2010/0215057 A1 * | 8/2010 | Frink | H04N 21/23608 370/474 |
| 2010/0235366 A1 | 9/2010 | Andrew et al. | |
| 2011/0055749 A1 | 3/2011 | Wallace et al. | |
| 2011/0196901 A1 * | 8/2011 | Kesselman | G06F 17/30336 707/813 |
| 2011/0235858 A1 | 9/2011 | Hanson et al. | |
| 2013/0013617 A1 * | 1/2013 | Cai | G06F 17/30336 707/746 |
| 2013/0086230 A1 * | 4/2013 | Guerra | H04L 12/6418 709/220 |

OTHER PUBLICATIONS msdn.microsoft.com, 2015, p. 1-2.*
Graham, et al., "Time as Essence for Photo Browsing Through Personal Digital Libraries", JCDL'02, Jul. 19-17, 2002, Portland, Oregon, USA.

* cited by examiner

Primary Examiner — Cheyne D Ly
(74) Attorney, Agent, or Firm — Keller Jolley Preece

(57) ABSTRACT

Embodiments are provided for date and time handling. In some embodiments, a timestamp and a location of creation for a content item is received, a time zone offset is retrieved for the location, the timestamp is converted into a local date and time using the time zone offset, and the local date and time and the time zone offset are used to create a value for a temporal identifier, and the temporal identifier is stored for the content item.

13 Claims, 5 Drawing Sheets

DATE AND TIME HANDLING

CROSS-REFERENCE TO RELATED PROVISIONAL APPLICATION

This application claims the benefit of U.S. Provisional Patent Application No. 61/801,318 filed Mar. 15, 2013, the disclosure of which is incorporated herein by reference in its entirety.

FIELD OF THE INVENTION

Various embodiments relate generally to date and time handling.

BACKGROUND

In various known content management systems, data may be stored with a timestamp to indicate a date and time when the data was last stored and/or created. A timestamp is a sequence of characters or encoded information identifying when a certain event occurred, usually giving date and time of day, sometimes accurate to a small fraction of a second. For example, image files may have a creation time tag with a timestamp value 2005-10-30 T 10:45 Coordinated Universal Time (UTC) stored with the image file.

Although there are various formats and systems for storing instances in time, Unix time is widely used with operating systems and file formats. Unix time is defined as the number of seconds that have elapsed since midnight UTC, not counting leap seconds. In order to determine the local time for a Unix timestamp, the time must be converted from UTC time using a time zone offset. The time zone offset is stored in a tz database (i.e., Olson database) and the time zone offset indicates an amount to add or subtract (e.g., +7 or −1) from the time for the particular time zone. Local rules for leap year and daylight seconds may or may not be retrieved, and adjustments may be made to the calculated local time to account for local rules where preferred. In some embodiments, local rules on daylight savings time and leap year may not be necessary to retrieve because client device 102 that captures the content item may account for the local rules with their system time and the creation time may be stored with a timestamp based off of the system time on client device. Similarly, content management system 100 may account for leap year and daylight savings time thereby not necessitating retrieval of local rules.

Applications that require frequent local time conversions also require numerous database accesses to retrieve all of the information necessary to make the conversions, and the resulting numerous accesses can present performance issues for the database. Furthermore, the continual need to perform conversions may require considerable processing time. Accordingly, there is a need for improved methods for date and time storage to reduce the impact on a database or system.

SUMMARY

Embodiments are provided for date and time handling. In some embodiments, a timestamp and a location of creation for a content item is received, a time zone offset is retrieved for the location, the timestamp is converted into a local date and time using the time zone offset, and the local date and time and the time zone offset are used to create a value for a temporal identifier, and the temporal identifier is stored for the content item.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
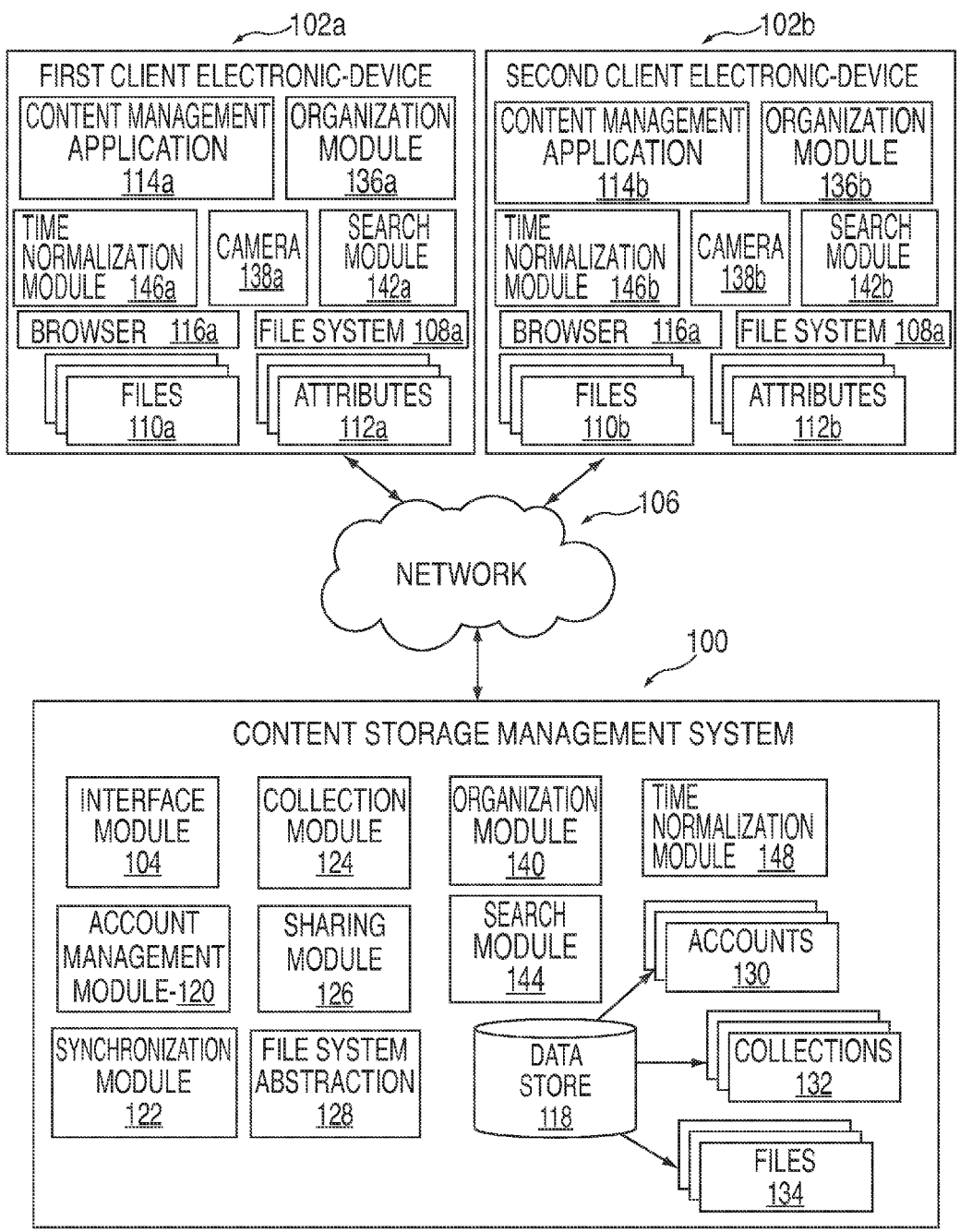
FIG. 1 is an exemplary system for date and time handling in accordance with some embodiments of the invention.

Methods, systems, and computer readable mediums for date and time handling are provided. Dates and times may be associated with content items in a content management system. The dates and times for each of the content items may be normalized to facilitate the performance of operations including, but not limited to, comparisons, sorting algorithms, basic mathematical operations, and/or grouping of content items based upon date and/or time. For example, each content item may be received having creation timestamps in one or more time formats, such as, for example, a UTC time format or a UNIX timestamp. Continuing with the example, converting each of the timestamps from the received format to a local date and time may normalize the date and time stored for each content item to allow for performing operations with the time and the date without having to retrieve the conversion information and perform the conversion for each operation.

In particular, a temporal identifier may be created for each content item using values for the local date and time and a time zone offset for the content item, and the temporal identifier may be used for operations that rely on date and time of content items. To convert dates and times from the received format to the local date and time, the time zone offset for a content item may be determined from a location stored with the content item. For example, the time zone offset may be retrieved from a database in accordance with the location where a file was created. The temporal identifier may be for example, a bit integer that is divided into year, month, day, hour, minute, second, millisecond, and offset bit portions, and populated with values determined from the local date and time and the time zone offset used to perform the conversion. Inclusion of the time zone offset in the temporal identifier provides a way to differentiate dates and times from various time zones for operations that rely on date and/or time of content items, while still allowing for storage and quick retrieval of local date and/or times for operations.

In some embodiments, the temporal identifier bit integer may be further divided to have a precision value. The precision value may indicate a level of trust or confidence in a granularity of time data saved for the date and/or time for the content item. For example, if the creation timestamp did not have a millisecond value, then the date and time value may be trusted for year, month, day, hour, minutes, and seconds, but not for milliseconds. In another example, a user may define a date and/or a time for the content item, and the precision value may indicate the granularity of data provided by the user. Continuing with the example, the user may only know the year for a content item, the precision level may thus indicate that the data for the date and the time for the content item is only trusted as to the year. Comparison, sorting, and basic mathematical operations with dates and/or times can be adjusted to account for content items that have a lower precision level than other content items.

For purposes of description and simplicity, methods, systems and computer readable mediums will be described for a content storage and management service, and in particular, organization and presentation of content items (e.g., images). However, the terms "content storage service" and "content management system" are used herein to refer broadly to a variety of storage providers and management service providers as well as handling a wide variety of types of content, files, portions of files, and/or other types of data. Those with skill in the art will recognize that the methods, systems, and mediums described for organizing and presenting content items may be used for a variety of storage providers/services and types of content, files, portions of files, and/or other types of data.

FIG. 1 is an exemplary system for presentation and organization of content in accordance with some embodiments of the invention. Elements in FIG. 1, including, but not limited to, first client electronic device 102a, second client electronic device 102b, and content management system 100 may communicate by sending and/or receiving data over network 106. Network 106 may be any network, combination of networks, or network devices that can carry data communication. For example, network 106 may be any one or any combination of LAN (local area network), WAN (wide area network), telephone network, wireless network, point-to point network, star network, token ring network, hub network, or any other configuration.

Network 106 can support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 can communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

Client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include creation time timestamp, geolocation, orientation, rotation, title, and/or any other attributes or data relevant to the captured image. Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.

A time normalization module 146 (e.g., 146a and 146b) may be used to normalize dates and times stored with a content item. The time normalization module 146, counterpart time normalization module 148, or any combination thereof may be used to normalize dates and times stored for content items. The normalized times and dates may be used to sort, group, perform comparisons, perform basic math, and/or cluster content items.

An organization module 136 (e.g., 136a and 136b) may be used to organize content items (e.g., image files) into clusters, organize content items to provide samplings of content items for display within user interfaces, and/or retrieve organized content items for presentation. Organization is described in U.S. Patent Application No. 61/794,184, entitled "Presentation and Organization of Content," filed on Mar. 15, 2013, and herein incorporated by reference in its entirety.

The organization module 136 may utilize any clustering algorithm, and may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items to cluster the content items.

In some embodiments, content items may be organized into clusters to aid with retrieval of similar content items in response to search requests. For example, organization module 136a may identify first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item for a particular date. In some embodiments, the search may be handled by searching cluster markers of stored images. In particular, cluster markers may indicate an approximate time or average time for the images stored with the cluster marker in some embodiments, and the marker may be used to speed the search and/or return the search results with the contents of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112a and 112b (collectively 112) or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104. Web browser 116a and 116b (collectively 116) may be used to display a web page front end for a client application that can provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 can be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 124 can interact with any number of other modules of content management system 100.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

Content items (e.g., files 110) can be stored in data store 118. Data store 118 can be a storage device, multiple storage devices, or a server. Alternatively, data store 118 can be cloud storage provider or network storage accessible via one or more communications networks. Content management system 100 can hide the complexity and details from client devices 102 by using a file system abstraction 128 (e.g., a file system database abstraction layer) so that client devices 102 do not need to know exactly where the content items are being stored by the content management system 100. Embodiments can store the content items in the same folder hierarchy as they appear on client device 102. Alternatively, content management system 100 can store the content items in various orders, arrangements, and/or hierarchies. Content management system 100 can store the content items in a network accessible storage (SAN) device, in a redundant array of inexpensive disks (RAID), etc. Content management system 100 can store content items using one or more partition types, such as FAT, FAT32, NTFS, EXT2, EXT3, EXT4, ReiserFS, BTRFS, and so forth.

Data store 118 can also store metadata describing content items, content item types, and the relationship of content items to various accounts, folders, collections, or groups. The metadata for a content item can be stored as part of the content item or can be stored separately. Metadata can be store in an object-oriented database, a relational database, a file system, or any other collection of data. In one variation, each content item stored in data store 118 can be assigned a system-wide unique identifier.

Data store 118 can decrease the amount of storage space required by identifying duplicate files or duplicate chunks of files. Instead of storing multiple copies, data store 118 can store a single copy of a file 134 and then use a pointer or other mechanism to link the duplicates to the single copy. Similarly, data store 118 can store files 134 more efficiently, as well as provide the ability to undo operations, by using a file version control that tracks changes to files, different versions of files (including diverging version trees), and a change history. The change history can include a set of changes that, when applied to the original file version, produce the changed file version.

Content management system 100 can be configured to support automatic synchronization of content from one or more client devices 102. The synchronization can be platform independent. That is, the content can be synchronized across multiple client devices 102 of varying type, capabilities, operating systems, etc. For example, client device 102a can include client software, which synchronizes, via a synchronization module 122 at content management system 100, content in client device 102 file system 108 with the content in an associated user account. In some cases, the client software can synchronize any changes to content in a designated folder and its sub-folders, such as new, deleted, modified, copied, or moved files or folders. In one example of client software that integrates with an existing content management application, a user can manipulate content directly in a local folder, while a background process monitors the local folder for changes and synchronizes those changes to content management system 100. In some embodiments, a background process can identify content that has been updated at content management system 100 and synchronize those changes to the local folder. The client software can provide notifications of synchronization operations, and can provide indications of content statuses directly within the content management application. Sometimes client device 102 may not have a network connection available. In this scenario, the client software can monitor the linked folder for file changes and queue those changes for later synchronization to content management system 100 when a network connection is available. Similarly, a user can manually stop or pause synchronization with content management system 100.

A user can also view or manipulate content via a web interface generated and served by user interface module 104. For example, the user can navigate in a web browser to a web address provided by content management system 100. Changes or updates to content in the data store 118 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 100 can include sharing module 126 for managing sharing content and/or collections of content publicly or privately. Sharing content publicly can include making the content item and/or the collection accessible from any computing device in network communication with content management system 100. Sharing content privately can include linking a content item and/or a collection in data store 118 with two or more user accounts so that each user account has access to the content item. In particular, the sharing module 126 can be used with the collections module 124 to allow sharing of a virtual collection with another user or user account. A virtual collection, may be a grouping of content identifiers that may be stored in various locations within file system of client device 102 and/or stored remotely at content management system 100. The sharing can be performed in a platform independent manner. That is, the content can be shared across multiple client devices 102 of varying type, capabilities, operating systems, etc. The content can also be shared across varying types of user accounts.

In some embodiments, content management system 100 can be configured to maintain a content directory or a database table/entity for content items where each entry or row identifies the location of each content item in data store 118. In some embodiments, a unique or a nearly unique content identifier may be stored for each content item stored in the data store 118.

Metadata can be stored for each content item. For example, metadata can include a content path that can be used to identify the content item. The content path can include the name of the content item and a folder hierarchy associated with the content item (e.g., the path for storage locally within a client device 102). In another example, the content path can include a folder or path of folders in which the content item is placed as well as the name of the content item. Content management system 100 can use the content path to present the content items in the appropriate folder hierarchy in a user interface with a traditional hierarchy view. A content pointer that identifies the location of the content item in data store 118 can also be stored with the content identifier. For example, the content pointer can include the exact storage address of the content item in memory. In some embodiments, the content pointer can point to multiple locations, each of which contains a portion of the content item.

In addition to a content path and content pointer, a content item entry/database table row in a content item database entity can also include a user account identifier that identifies the user account that has access to the content item. In some embodiments, multiple user account identifiers can be associated with a single content entry indicating that the content item has shared access by the multiple user accounts. To share a content item privately, sharing module 126 can be configured to add a user account identifier to the content entry or database table row associated with the content item, thus granting the added user account access to the content item. Sharing module 126 can also be configured to remove user account identifiers from a content entry or database table rows to restrict a user account's access to the content item. The sharing module 126 may also be used to add and remove user account identifiers to a database table for virtual collections.

To share content publicly, sharing module 126 can be configured to generate a custom network address, such as a uniform resource locator (URL), which allows any web browser to access the content in content management system 100 without any authentication. To accomplish this, sharing module 126 can be configured to include content identification data in the generated URL, which can later be used to properly identify and return the requested content item. For example, sharing module 126 can be configured to include the user account identifier and the content path in the generated URL. Upon selection of the URL, the content identification data included in the URL can be transmitted to content management system 100 which can use the received content identification data to identify the appropriate content entry and return the content item associated with the content entry.

To share a virtual collection publicly, sharing module 126 can be configured to generate a custom network address, such as a uniform resource locator (URL), which allows any web browser to access the content in content management system 100 without any authentication. To accomplish this, sharing module 126 can be configured to include collection identification data in the generated URL, which can later be used to properly identify and return the requested content item. For example, sharing module 126 can be configured to include the user account identifier and the collection identifier in the generated URL. Upon selection of the URL, the content identification data included in the URL can be transmitted to content management system 100 which can use the received content identification data to identify the appropriate content entry or database row and return the content item associated with the content entry or database row.

In addition to generating the URL, sharing module 126 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 126 can be configured to change the value of the flag to 1 or true after generating a URL to the content item.

In some embodiments, sharing module 126 can also be configured to deactivate a generated URL. For example, each content entry can also include a URL active flag indicating whether the content should be returned in response to a request from the generated URL. For example, sharing module 126 can be configured to only return a content item requested by a generated link if the URL active flag is set to 1 or true. Changing the value of the URL active flag or Boolean value can easily restrict access to a content item or a collection for which a URL has been generated. This allows a user to restrict access to the shared content item without having to move the content item or delete the generated URL. Likewise, sharing module 126 can reactivate the URL by again changing the value of the URL active flag to 1 or true. A user can thus easily restore access to the content item without the need to generate a new URL.

Figure 2:
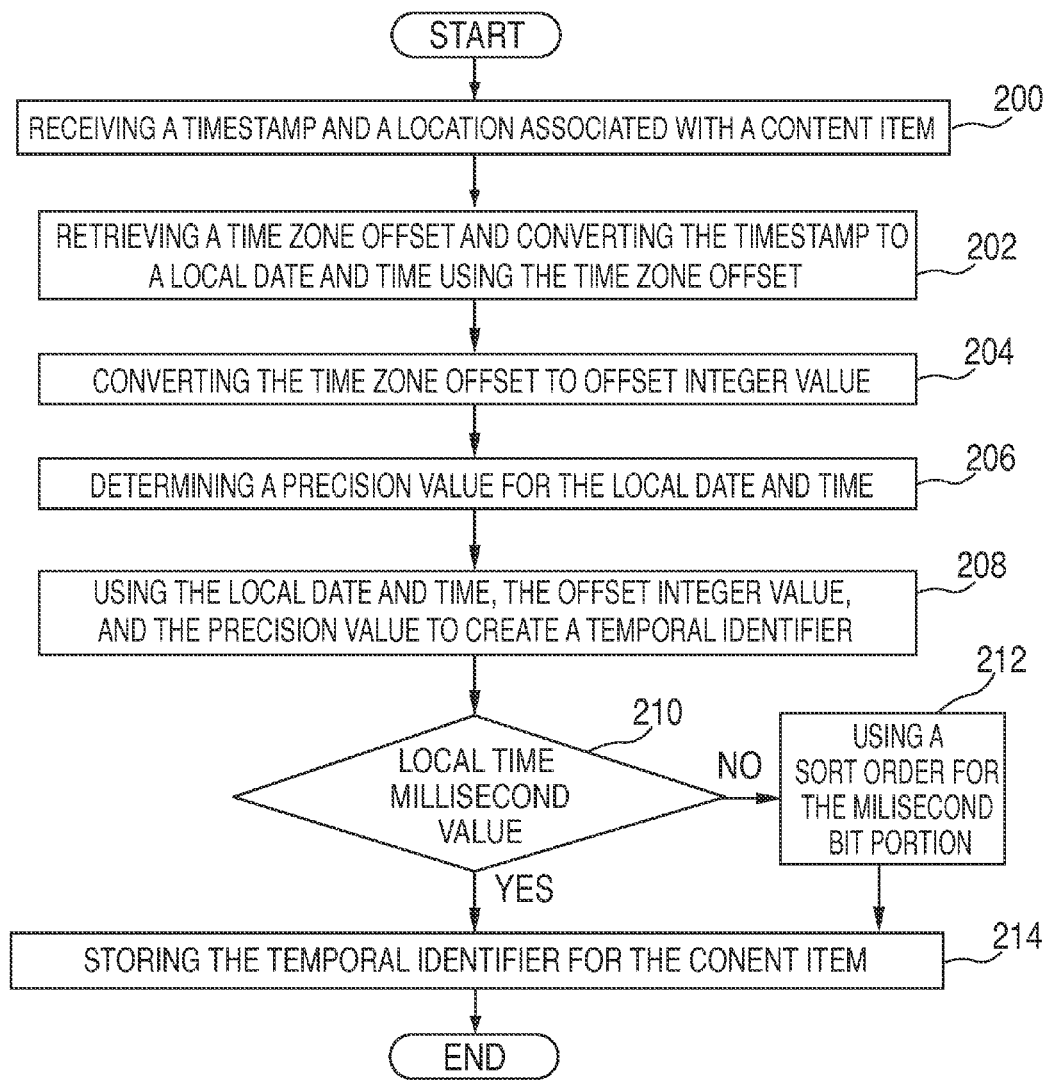
FIG. 2 is an exemplary flowchart for date and time handling in accordance with some embodiments of the invention.

FIG. 2 is an exemplary flowchart for date and time handling in accordance with some embodiments of the invention. FIG. 2 is an exemplary flowchart for creating normalized dates and times for content item, such as digital images. The dates and times may be normalized for content items by storing (I) the local date and time and (II) an offset used to convert the time from a received format to the local date and time. In some embodiments, the normalized date and time is stored as a bit integer for the content item. The normalized time for a creation date and time of a content item (e.g., an image file) may serve as a temporal identifier for the file. The identifier may be used for processing the content item (e.g., sorting, comparisons) and serve as a nearly unique identifier for the content item to retrieve the content item. Although the flowchart is described with particular examples for images, those with skill in the art will recognize that a normalized time and/or date using the described methods may be created for any type of content item.

A timestamp and a location associated with a content item may be received (200). The timestamp and the location may be metadata stored with the content item. The metadata may be stored as attributes of a file and/or stored in a database for the content item. For example, the timestamp may be a value stored with a corresponding creation date tag, and the location may be a value stored with a corresponding geo-location tag of a digital image file.

A time zone offset may be retrieved and used to convert the timestamp to a local date and time (202). The location may be used to query a database to retrieve the time zone offset. For example, the location may be used to retrieve the time zone offset from the tz database for a timestamp received in a Unix timestamp or UTC time format. Continuing with the example, if the location is a geolocation, then the latitude and longitude provided with the geolocation may be used to determine the corresponding time zone supported within the tz database for the location.

Optionally, time zone rules may also be retrieved and may provide additional information such as daylight savings time, leap years, and/or any other rules for the location that may alter the local date and time calculated. Although examples are provided that query the tz database for the time zone offset, those with skill in the art will recognize that any database, processing, and/or application programming interface (API) may be used to determine the time zone and the corresponding time zone offset for the received location.

The time zone offset may be used to calculate the local date and time (202). If the timestamp is a Unix timestamp, then the timestamp may be converted from seconds to a UTC time. The time zone offset (e.g., −12 through +14 hours and/or a number of fifteen minute intervals from UTC) may then be applied to the UTC time to determine the local time for the content item. For example, UTC time 2010-06-05 13:30:23 with an offset of −5:00 (e.g., UTC-5:00 for time zone USA-NY) would have a local time of 2010-06-05 08:30:23 whereas Venezula with an offset of −4:30 (e.g., −4 hours and two 15 minute intervals) would have a local time of 2010-06-05 08:00:23.

In some embodiments, a time zone offset may not be used to calculate the local date and time. For example, the timestamp provided may be stored in local date and time, and in such cases, the time zone offset corresponding to the location for the content item may still be used to create the temporal identifier. By way of example, if the location indicates that the content item was created in New York, USA, then the time zone offset for −5:00 UTC may be used in a calculation for an integer value of a time zone offset for the temporal identifier. In another example, a user may define the timestamp and/or local time and date for the content item, and a placeholder value may be used for the integer time zone offset value. Continuing with the placeholder example, the placeholder may be a value or a calculation for the time zone offset using a value for an offset not found in the tz database (e.g., −13 or +15), such as a value beyond the range of offsets defined in the tz database.

The time zone offset may be converted to an offset integer value (204). An unsigned integer value representing the time zone offset (e.g., −12 through +14 hours from UTC) may be calculated and used for the temporal identifier. For example, in order to represent the time zone offset as an unsigned 11 bit integer, the offset integer value may be calculated using the following equation: offset integer value=(time zone offset+12 hours)/60. Continuing with the example, the following illustrates (1) a calculation to determine an offset integer value, and (2) a calculation to determine the offset from the offset integer value:

$$-7 \text{ hours } (-25200 \text{ seconds}) \Rightarrow (-25200+43200)/60 = 300 \text{ minute offset} \quad (1)$$

$$300 \text{ minute offset} \Rightarrow ((300*60)-43200) \Rightarrow -7 \text{ hours } (-25200 \text{ seconds}). \quad (2)$$

In another example for a timezone offset integer value, the following illustrates (3) a calculation for an offset integer value using a time zone offset, and (4) pseudocode to generate a time zone offset integer using such a calculation:

$$((\text{time zone offset(in seconds)}/3600)+12)*4 \quad (3)$$

$$\text{timezone\_offset} = ((\text{timezone\_offset}/3600)+12)*4 \quad (4)$$

In calculation (3) and, of course, pseudocode (4), the integer value result represents a number of fifteen minute intervals from or ahead of a lowest bound for time zones used in an exemplary system (e.g., UTC-12). In calculation (3), time zone offsets may be represented with values between 0-127 for a number of fifteen minute intervals from the lowest bound for time zones. Those with skill in the art will recognize that there are many different formulas and/or calculations that can be performed to generate a time zone offset integer value, and that various alternate time zone systems, with different upper and lower bounds, and different temporal intervals offset form said bounds, may be used, in analogous fashion.

A precision value for the local date and time may be determined (206). The precision value may provide a value indicating what portion of the date and time values are valid. In particular, the precision value may indicate a granularity for date and/or time data values that is trusted. For example, a camera may not store milliseconds for a creation time timestamp of a captured image, and the captured image local date and time value converted from the timestamp may only be trusted up to the second value (e.g., 2010-06-05 08:30:23 is trusted up to the second value "23," but not "2010-06-05 08:30:23:00" which includes the millisecond value "00").

The precision values may be assigned as provided in the table 2.1, as follows:

TABLE 2.1

| Precision value | Time and/or Date |
|---|---|
| 9 | Decade |
| 8 | Year |
| 7 | Season |
| 6 | Month |
| 5 | Day |
| 4 | Part of Day |
| 3 | Hour |
| 2 | Minute |
| 1 | Second |
| 0 | Millisecond |

Continuing with the above example and using table 2.1, the precision value for the captured image is 1 because the date and time value stored is trusted up through the second field. The following table 2.2 provides examples of precision values and examples of the corresponding trusted date and time values for the precision values:

TABLE 2.2

| Precision | Year | Month | Day | Hour | Minute | Second | ms |
|---|---|---|---|---|---|---|---|
| ms, 0 | 2010 | 5 | 4 | 13 | 30 | 23 | 326 |
| Second, 1 | 2010 | 5 | 4 | 13 | 30 | 23 | |
| Minute, 2 | 2010 | 5 | 4 | 13 | 30 | | |
| Hour, 3 | 2010 | 5 | 4 | 13 | | | |
| Day, 5 | 2010 | 5 | 4 | | | | |
| Month, 6 | 2010 | 5 | | | | | |
| Year, 8 | 2010 | | | | | | |

As shown in table 2.2, for precision value "5," the local date and time for the content item is trusted for May 4, 2010.

In some embodiments, dates may have reduced precision and are deemed "fuzzy." For example, a user may input dates and times and/or alter dates and times for a particular image. The inputted values may be an educated guess as to the date and the time, and thus, may be deemed a "fuzzy" date and time with less precision or confidence in the date and time value. Indicating the level of precision or confidence in the stored time and date for the content item may allow for adjusting sorting, comparisons, and/or any other processing performed with the content item. This means logical values such as 1940s, June 2010, or Morning of Dec. 7, 1941 can be differentiated from exact values, such as 1940-01-01T00:00:00, and 2010-06-01T00:00:00 respectively, can be differentiated from 1941-12-07T07:48:15.

Placeholder values may be stored for unknown values and/or values that are deemed less trusted as indicated by the precision level. For example, if the local date and time precision value indicates the time and date is trusted up to the second (e.g., precision value "1"), then a millisecond value may not be stored for the content item date and time. The following is table 2.3 provides examples of precision values, corresponding trusted date and time values, and placeholder values:

TABLE 2.3

| Precision | Year | Month | Day | Hour | Minute | Second | ms |
|---|---|---|---|---|---|---|---|
| ms, 0 | 2010 | 5 | 4 | 13 | 30 | 23 | 326 |
| Second, 1 | 2010 | 5 | 4 | 13 | 30 | 23 | 4096 |
| Minute, 2 | 2010 | 5 | 4 | 13 | 30 | 61 | 4096 |
| Hour, 3 | 2010 | 5 | 4 | 13 | 61 | 61 | 4096 |
| Day, 5 | 2010 | 5 | 4 | 25 | 61 | 61 | 4096 |
| Month, 6 | 2010 | 5 | 33 | 25 | 61 | 61 | 4096 |
| Year, 8 | 2010 | 13 | 33 | 25 | 61 | 61 | 4096 |

In some embodiments, placeholder values may be stored for units of dates and times that are beyond a value that is possible for the unit of time and/or a max value for the corresponding bit portion as shown in Table 2.4. For example, as shown in table 2.3, a placeholder value may be stored as the second value may be greater than "60."

The local date and time, the offset integer value, and the precision value may be used to create the temporal identifier for the content item (208). In some embodiments, the temporal identifier may be a 64 bit integer formed with the local date and time, the offset integer value and the precision value, as shown in Table 2.4:

TABLE 2.4

| | |
|---|---|
| Prefix (bits 1, bit position 0) | A prefix of "1" may be used to ensure leading zeros are not striped away with storage, manipulation, access, and/or retrieval of the temporal identifier (e.g., "000001" may be converted to "1" if leading zeros are stripped away, whereas with "100001," the leading zeros for the next bit values remain). An alternative approach may be to prepend the leading zeros at the time of use of the temporal identifier to ensure a 64 bit size. |
| Year (bits 13, bit positions 1-13) | Integer value representing the year (e.g., with values 0-8191). Adjustments to the size of the bit integer may be made to accommodate B.C. (Before Christ) dates in the Julian and the Gregorian calendar. |
| Month (bits 4, bit positions 14-17) | Integer value representing the month of the year (e.g., with values 0-11 and a maximum value of 15) |
| Day (bits 5, bit positions 18-22) | Integer value representing the day of the month (e.g., with values 0-31) |
| Hour (bits 5, bit positions 23-27) | Integer value representing the hour of the day (e.g., with values 0-23 and a maximum value of 31) |
| Minute (bits 6, bit positions 28-33) | Integer value representing the minute portion of a time (e.g., with values 0-59 and a maximum value of 63) |
| Second (bits 6, bit positions 34-39) | Integer value representing the second portion of a time (e.g., with values 0-59 and a maximum value of 63) |
| Millisecond/Sort Order (bits 10, bit positions 40-49) | Integer value representing either the millisecond segment of a time (e.g., with values 0-999) or a sub-second sort order (e.g., with values 0-1023) |
| Time zone offset (bits 7, bit positions 50-56) | Unsigned integer value to represent the time zone offset (e.g., offset + 12 hours/15 minutes, with offset values −12 through +14 hours), such as in 15 minute increments from the lowest bound of timezones |
| Day of week (bits 3, bit positions 57-59) | Integer value to represent day of week (e.g., 0 = Sunday, 1 = Monday, etc.) |
| Precision (bits 4, bit positions 60-63) | Integer value representing the precision for the local date and/or time (e.g., with values 0-9) |

As shown in table 2.4, a sort order may replace the millisecond value for the bit integer. If the local time does not have a millisecond value (210), then a sort order may be stored in the millisecond portion of the bit integer (212). For example, a sequence order value stored as an attribute with an image file may be stored as the sort order for the image. Continuing with the example, this may ensure that if a camera captured images within the same second, then the order that the images were captured may be preserved to ensure more accurate sorting of the images. Although a particular exemplary basis is provided for incorporating sort order, those with skill in the art will recognize that there could be many reasons to store a sort order. For example, a user may override chronological order and assign their own ordering to a group of images captured at the same date and/or time. Continuing with FIG. 2, processing may continue with storage of the temporal identifier (214).

Alternatively, if there is a millisecond value for the local time (210), then processing continues and the temporal identifier is stored for the content item (214). The bit integer created may be encoded to create the temporal identifier. For example, an API and/or programming language standard library function may take the bit integer as input and return the binary encoded bit integer, such as an in ASCII (American Standard Code for Information Interchange) text string or any other data type. The encoded bit integer may be stored as the temporal identifier for the content item.

The following set of tables 2.5 to 2.11 illustrate examples of conversions from UTC time to local time, and the corresponding encoded binary temporal identifiers. The temporal identifiers are presented in sorted chronological order. Table 2.5 illustrates an example of a temporal identifier created with a UTC time that has a precision of "1" and is trusted to the second value. As such, a placeholder "1023" maximum value is used for the "millisecond value."

TABLE 2.5

| | |
|---|---|
| UTC Time | 2009-04-16T12:15:08−7 |
| Year | 2009 |

TABLE 2.5-continued

| | |
|---|---|
| Month | 3 |
| Day | 15 |
| Hour | 12 |
| Minute | 15 |
| Second | 8 |
| Millisecond | 1023 |
| timezone offset | 20 |
| day of week | 4 |
| Precision | 1 |
| encoded numeric | 11485549882173803073 |
| encoded binary | 1001111101100100110111101100001111001000 1111111100101001000001 |

Table 2.6 and Table 2.7 illustrate examples of UTC times that are the same, but have different time zone offsets. As such, encoded binary temporal identifier provided in Table 2.6 with timezone offset "+1" and offset integer value "52" is sorted before the encoded binary temporal identifier in Table 2.7 with timezone offset "−5" with offset integer value "20." The integer timezone offset values represent the number of fifteen minute intervals from the lowest bound for time zones.

TABLE 2.6

| | |
|---|---|
| UTC Time | 2010-06-05T13:30:23:312+1 |
| year | 2010 |
| month | 5 |
| day | 4 |
| hour | 13 |
| minute | 30 |
| second | 23 |
| millisecond | 312 |
| timezone offset | 52 |
| day of week | 6 |
| precision | 0 |
| encoded numeric | 11486792415378807392 |
| encoded binary | 1001111101101001010010001101011100 1011101001110000110100110000 |

TABLE 2.7

| | |
|---|---|
| UTC Time | 2010-06-05T13:30:23:312–5 |
| year | 2010 |
| month | 5 |
| day | 4 |
| hour | 13 |
| minute | 30 |
| second | 23 |
| millisecond | 312 |
| timezone offset | 28 |
| day of week | 6 |
| precision | 0 |
| encoded numeric | 11486792415378804320 |
| encoded binary | 1001111101101001010001010101011100 10111010011100000111001100000 |

Table 2.8 illustrates a temporal identifier with a precision value of "3" indicating that the date and time are trusted to the "hour" value. As such, placeholders for the maximum values are used for the minute, second, and millisecond. The maximum values are the maximum values that may be stored for the corresponding bit portions reserved for minutes, seconds, and milliseconds. The maximum values may exceed what is possible for each of the respective units of time. For example, the maximum value for the minute may be greater than or equal to 60.

TABLE 2.8

| | |
|---|---|
| UTC Time | 2010-06-05T13–7 |
| year | 2010 |
| month | 6 |
| day | 4 |
| hour | 13 |
| minute | MAX |
| second | MAX |
| millisecond | MAX |
| timezone offset | 28 |
| day of week | 6 |
| precision | 3 |
| encoded numeric | 11486792451495022179 |
| encoded binary | 1001111101101001010010001101111 111111111111111100111001100011 |

Table 2.9 illustrates a temporal identifier with a precision value of "8" indicating that the date and time are trusted to the "year" value. As such, placeholders with the maximum values are used for the month, day, hour, minute, second, and millisecond. In some embodiments, dates and times with less precision are sorted after times with more precision. As shown, the date and the time with the year of 2010 and precision only up to the year are sorted after dates and times with more precision in 2010 (e.g., Tables 2.6-2.8).

TABLE 2.9

| | |
|---|---|
| UTC Time | 2010 |
| year | 2010 |
| month | MAX |
| day | MAX |
| hour | MAX |
| minute | MAX |
| second | MAX |
| millisecond | MAX |
| timezone offset | MAX |
| day of week | MAX |
| precision | 8 |
| encoded numeric | 11487556749515292664 |
| encoded binary | 1001111101010111111111111111111 111111111111111111111111111000 |

TABLE 2.10

| | |
|---|---|
| UTC Time | 2013-03-15T9:40:54–7 |
| year | 2013 |
| month | 2 |
| day | 14 |
| hour | 9 |
| minute | 40 |
| second | 54 |
| millisecond | MAX |
| timezone offset | 20 |
| day of week | 5 |
| precision | 1 |
| encoded numeric | 11489980735490607697 |
| encoded binary | 1001111101110100010110101001101000 11011011111111111100101000001 |

Temporal identifiers may be used to search for particular dates. For example, all years in 2009 may be retrieved when querying the database for temporal identifiers that are between "10011111011001000000000000000000000000100000000 0000000001100000000" and "10011111011001111 11111111111111111111111111111111111111111111."

Those with skill in the art will recognize that there are many variations available for creation of the temporal identifier with the local time and date, the offset integer value, and/or the precision value both with variations in the data used to create the identifier and the data type used as storage for the identifier. For example, the local time and date as well as the offset integer value may be the only values used for the temporal identifier. In another example, the values could be strings that are concatenated together to form a temporal identifier stored as a string instead of a bit integer.

Figure 3:
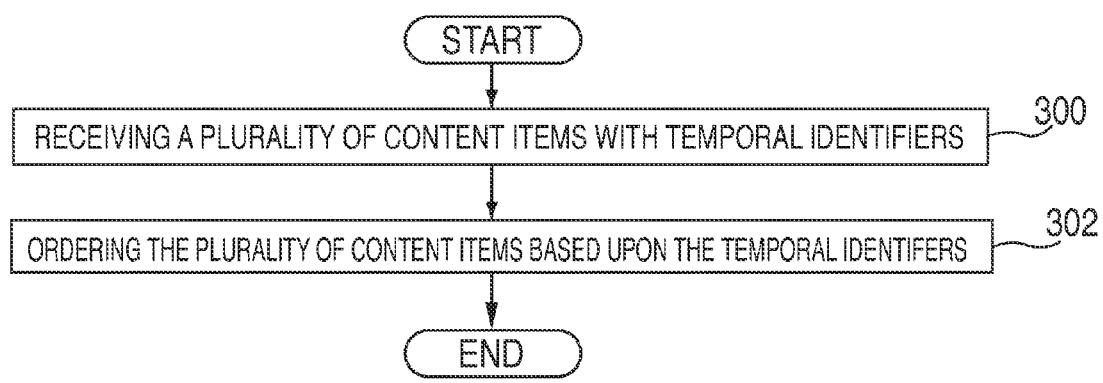
FIG. 3 is an exemplary flowchart for date and time handling in accordance with some embodiments of the invention.

FIG. 3 is an exemplary flowchart for date and time handling in accordance with some embodiments of the invention. A plurality of content items with temporal identifiers may be received (300). The content items may be sorted using the temporal identifiers (302). Local times and dates with a higher precision value may be sorted before local times and dates with less precision. For example, images having similar dates and times with a precision value of "0" will be ordered before images with precision value "1." Continuing with the example, images with 1941-12-07T07.48:15:00 precision "0" may be ordered before 1941-12-07T07:48:15 precision "1." The inclusion of the offset with the temporal identifier allows for ordering in accordance with the time zone without further processing. For example, 1941-12-07T07.48:15 with offset 5 comes before 1941-12-07T07.48:15 with offset 6.

Precision values may further differentiate content items sorted. For example, content items with a precision value of "0," which are trusted through the millisecond time value, may be differentiated from content items with a precision value of "1," which are trusted through the second time value. Continuing with the example, an approach to sorting may sort content item with more precision in the date and/or time before content items with less precision (e.g., sort a time trusted through a millisecond value before a time trusted through a second value).

Figure 4:
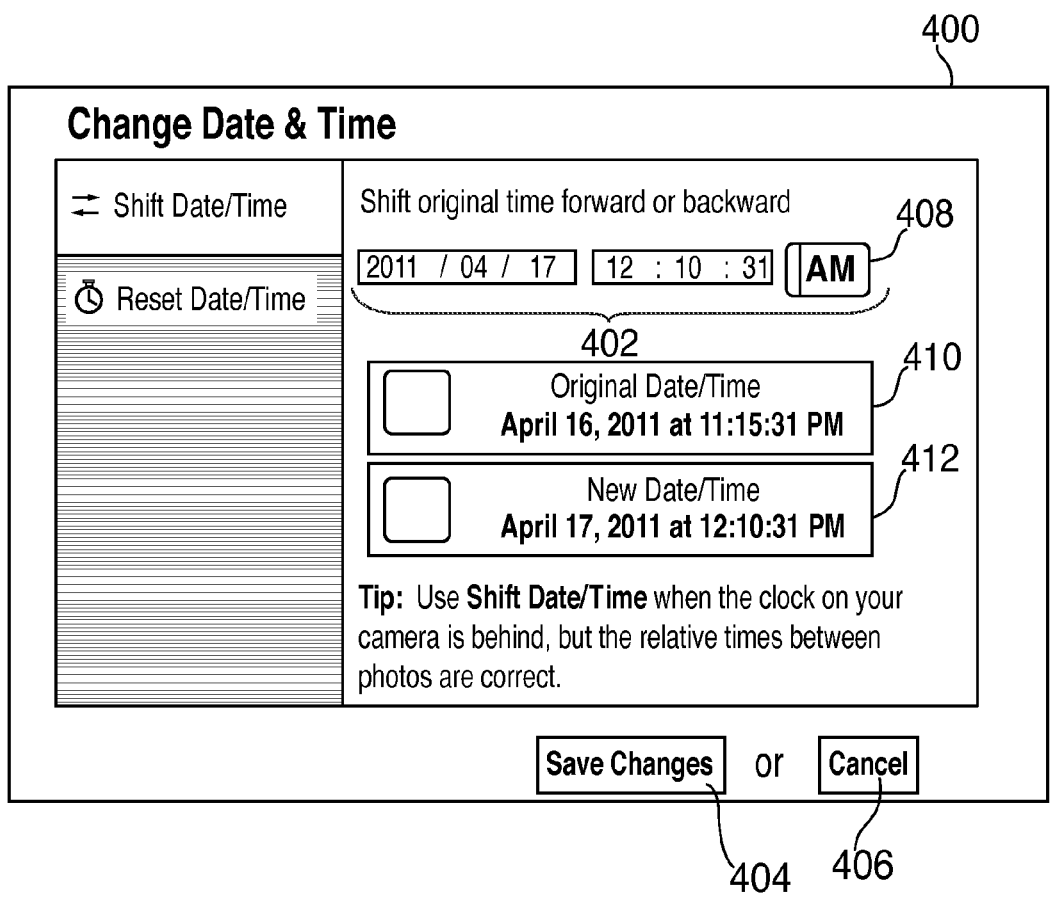
FIG. 4 illustrates an exemplary user interface facilitating temporal configuration in accordance with some embodiments of the invention.

FIG. 4 illustrates an exemplary user interface in accordance with some embodiments of the invention. FIG. 4 illustrates a user interface 400 with user interface text entry 402 and AM/PM 408 controls for entry and review of a user defined date and time. The user interface provides user interface controls for saving the date and/or time changes 404 entered or to cancel 406 changes to the local date and time. The original date 410 as well as the proposed new date 412 may be displayed in the user interface 400.

Figure 5:
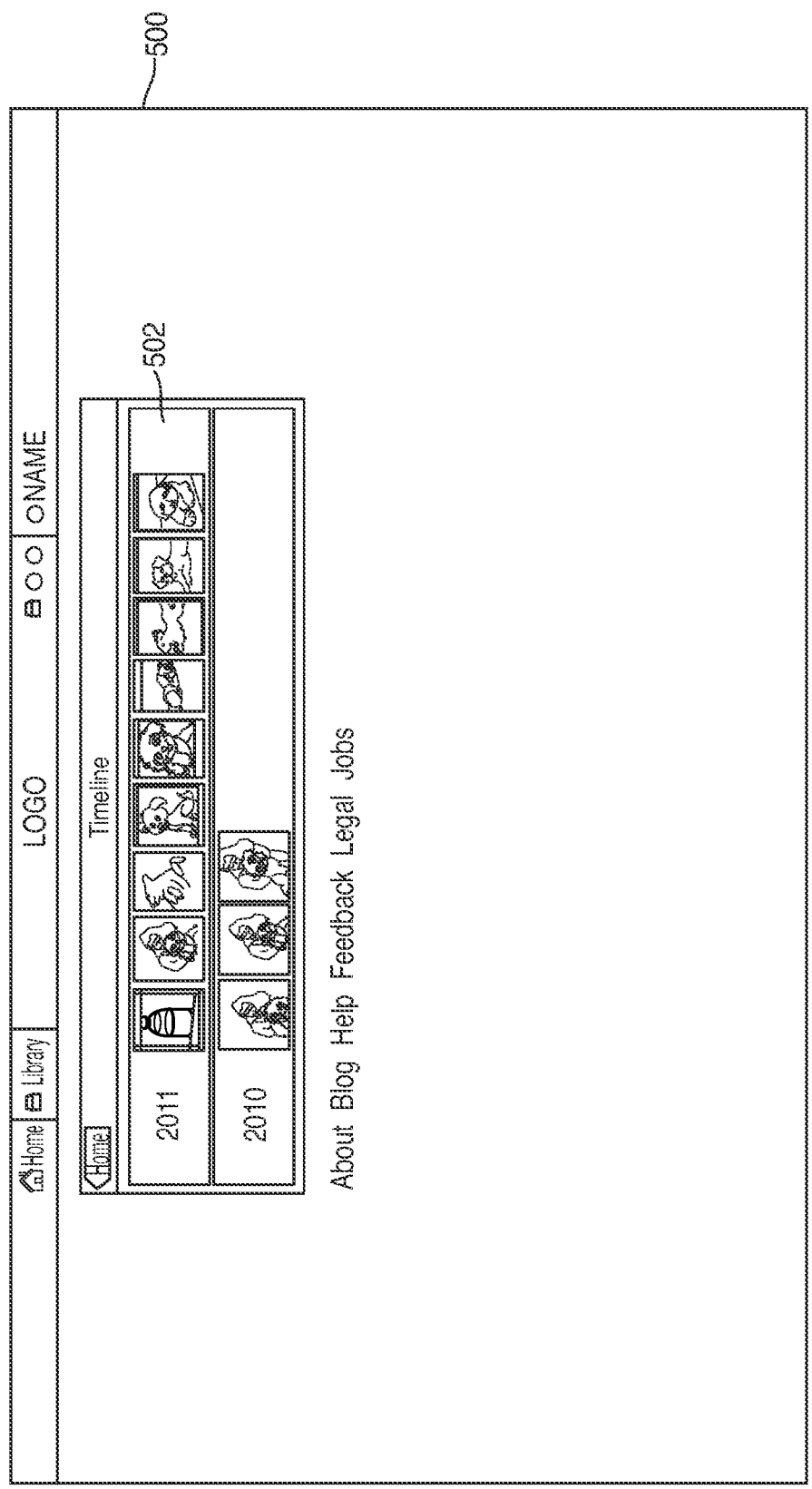
FIG. 5 illustrates an exemplary user interface for date and time handling in accordance with some embodiments of the invention.

FIG. 5 illustrates an exemplary user interface for date and time handling in accordance with some embodiments of the invention. As shown in user interface 500, content items as displayed in section 502 of the user interface that span years may easily sorted and displayed using the temporal identifier. For example, all of the temporal identifiers for image content items stored for an account within the content management system may be sorted and stored in a vector. A sample of content items may be selected from the vector and displayed as shown in section 502. An example of selecting samples of content items is provided in U.S. Provisional Application entitled "Presentation and Organization of Content," with Application No. 61/794,184, filed on Mar. 15, 2013, and is incorporated by reference in its entirety.

Any suitable programming language can be used to implement the routines of particular embodiments including C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for date and time handling thereof, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method for date and time handling, comprising:
receiving a timestamp and a location of creation for a content item;
retrieving a time zone offset for the location;
converting the timestamp into a local date and time using the time zone offset;
creating, using the converted timestamp, a temporal identifier comprising a bit integer comprising bit integer fields, the bit integer fields comprising a year field, a month field, a day field, an hour field, a minute field, a second field, a millisecond field, a day of the week field, an offset field, and a precision field having a value associated with one or more values present in the timestamp, wherein the value of the precision field indicates a precision level of one or more values of the timestamp represented by the bit integer fields;
storing the temporal identifier for the content item;
receiving a query for the content item; and
retrieving the content item identified by the temporal identifier.

2. The method of claim 1, further comprising storing a sort order value for the content item within the millisecond field of the bit integer.

3. The method for date and time handling of claim 1, further comprising:
receiving a user defined date and time for the content item overriding the timestamp;
using the user defined date and time to create the temporal identifier;
determining a precision value for the user defined date and time; and
creating the temporal identifier with (i) the user defined date and time and (ii) the precision value.

4. A non-transitory computer readable medium containing instructions that, when executed by at least one processor of a computing device, causes the computing device to:
receive a timestamp and a location of creation for a content item;
retrieve a time zone offset for the location;
convert the timestamp into a local date and time using the time zone offset;
create, using the converted timestamp, a temporal identifier comprising a bit integer comprising bit integer fields, the bit integer fields comprising a year field, a month field, a day field, an hour field, a minute field, a second field, a millisecond field, a day of the week field, an offset field, and a precision field having a value associated with one or more values present in the timestamp, wherein the value of the precision field indicates a prediction level of one or more values of the timestamp represented by the bit integer fields;
store the temporal identifier for the content item;
receive a query for the content item; and
retrieve the content item identified by the temporal identifier.

5. The non-transitory computer readable medium of claim 4, wherein the instructions when executed by at least one processor of the computing device, further cause the computing device to store a sort order value for the content item in the millisecond field of the bit integer.

6. A system for date and time handling, the system comprising:
   one or more processors; and
   memory containing instructions that, when executed, cause the one or more processors to:
   receive a timestamp and a location of creation for a content item;
   retrieve a time zone offset for the location;
   convert the timestamp into a local date and time using the time zone offset;
   create, using the converted timestamp, a temporal identifier comprising a bit integer comprising bit integer fields, the bit integer fields comprising a year field, a month field, a day field, an hour field, a minute field, a second field, a millisecond field, a day of the week field, an offset field, and a precision field having a value associated with one or more values present in the timestamp, wherein the value of the precision field indicates a precision level of one or more values of the timestamp represented by the bit integer fields;
   store the temporal identifier for the content item;
   receive a query for the content item; and
   retrieve the content item identified by the temporal identifier.

7. The system of claim 6, wherein the memory further contains instructions that, when executed, cause the one or more processors to store a sort order value for the content item in the millisecond field of the bit integer.

8. The system of claim 6, the memory containing instructions that, when executed, cause the one or more processors to:
   receive a user-defined date and time for the content item, the user-defined date and time overriding the timestamp;
   use the user-defined date and time to create the temporal identifier;
   determine the precision value for the user-defined date and time; and
   create the temporal identifier with the user defined-date and time and the precision value.

9. The system of claim 6, wherein the precision value indicates an absence of information for at least one of a year, a month, a day, an hour, a minute, a second, or a millisecond.

10. The system of claim 6, wherein the bit integer comprises 64-bit integer, and wherein each of the year, month, day, hour, minute, second, millisecond, day of week, and offset fields comprises a plurality of bits of the 64-bit integer.

11. The method of claim 1, wherein the value of the precision field indicates an absence of information for at least one of the year, month, day, hour, minute, second, or millisecond of the bit integer.

12. The non-transitory computer readable medium of claim 4, wherein creating the temporal identifier comprises creating a 64-bit integer comprising multiple bits for each of the year, month, day, hour, minute, second, millisecond, day of the week, and offset fields.

13. The method of claim 1, further comprising sorting, using the created temporal identifier, the content item relative to one or more additional content items.

* * * * *